(12) United States Patent
Inagaki et al.

(10) Patent No.: US 10,655,572 B2
(45) Date of Patent: May 19, 2020

(54) EXHAUST GAS RECIRCULATION VALVE

(71) Applicant: AISAN KOGYO KABUSHIKI KAISHA, Obu-shi, Aichi (JP)

(72) Inventors: Takashige Inagaki, Obu (JP); Mamoru Yoshioka, Nagoya (JP); Naruto Ito, Nisshin (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/090,659

(22) PCT Filed: Mar. 30, 2017

(86) PCT No.: PCT/JP2017/013176
§ 371 (c)(1),
(2) Date: Oct. 2, 2018

(87) PCT Pub. No.: WO2017/191718
PCT Pub. Date: Nov. 9, 2017

(65) Prior Publication Data
US 2019/0203673 A1    Jul. 4, 2019

(30) Foreign Application Priority Data

May 6, 2016 (JP) .................... 2016-093329

(51) Int. Cl.
*F02M 26/70* (2016.01)
*F16K 1/226* (2006.01)
*F16K 1/22* (2006.01)

(52) U.S. Cl.
CPC .............. *F02M 26/70* (2016.02); *F16K 1/22* (2013.01); *F16K 1/226* (2013.01)

(58) Field of Classification Search
CPC ............ F02M 26/70; F16K 1/22; F16K 1/226
See application file for complete search history.

(56) References Cited

U.S. PATENT DOCUMENTS

| 2,980,388 | A | * | 4/1961 | White | ..................... F16K 1/226 251/175 |
| 4,281,817 | A | | 8/1981 | Adams et al. | |

(Continued)

FOREIGN PATENT DOCUMENTS

| JP | S58-149475 A | 9/1983 |
| JP | S63-190668 U | 12/1988 |

(Continued)

OTHER PUBLICATIONS

Nov. 6, 2018 International Preliminary Report on Patentability issued in International Patent Application No. PCT/JP2017/013176.

(Continued)

*Primary Examiner* — Eric Keasel
(74) *Attorney, Agent, or Firm* — Oliff PLC

(57) ABSTRACT

A valve housing that has a flow passage. Arranged in the flow passage are a valve seat that includes a valve hole, valve body that can be seated on the valve seat, and a section of a rotary shaft with the valve body fixed to the tip thereof. A ring-shaped seat surface is formed in the valve hole of the valve seat. A ring-shaped sealing surface corresponding to the seat surface is formed on the perimeter of the disc-shaped valve body. By rotating the rotary shaft, the valve body rotates open from a closed state in which the valve body is seated on the valve seat and the sealing surface is in contact with the seat surface. A tapered upstream-side flow regulating part is provided in the valve hole of the valve seat, so as to widen from the seat surface toward the upstream side of the EGR gas flow.

3 Claims, 11 Drawing Sheets

(56) References Cited

U.S. PATENT DOCUMENTS

| | | | |
|---|---|---|---|
| 4,817,916 A * | 4/1989 | Rawstron | F16K 1/24 |
| | | | 251/162 |
| 6,338,468 B1 | 1/2002 | Ogawa et al. | |
| 6,698,717 B1 | 3/2004 | Brookshire et al. | |
| 2009/0014675 A1 | 1/2009 | Barker et al. | |
| 2012/0181468 A1 | 7/2012 | Telep et al. | |
| 2013/0247861 A1 * | 9/2013 | Awasaka | F01L 1/00 |
| | | | 123/188.1 |
| 2016/0290513 A1 | 10/2016 | Asanuma et al. | |
| 2016/0290514 A1 | 10/2016 | Misumi et al. | |

FOREIGN PATENT DOCUMENTS

| | | |
|---|---|---|
| JP | 3017058 U | 10/1995 |
| JP | 2001-004037 A | 1/2001 |
| JP | 2001-317640 A | 11/2001 |
| JP | 2011-007313 A | 1/2011 |
| JP | 2011-179625 A | 9/2011 |
| JP | 2012-077845 A | 4/2012 |
| JP | 5759646 B1 | 8/2015 |
| JP | 2015-218833 A | 12/2015 |
| WO | 2013/190589 A1 | 12/2013 |
| WO | 2015/098954 A1 | 7/2015 |

OTHER PUBLICATIONS

Jun. 27, 2017 International Search Report issued in International Patent Application No. PCT/JP2017/013176.
Dec. 10, 2019 Office Action issued in Japanese Patent Application No. 2016-093329.

* cited by examiner

EXHAUST GAS RECIRCULATION VALVE

CROSS-REFERENCE TO RELATED APPLICATIONS

This is a US national phase application based on the PCT International Patent Application No. PCT/JP2017/013176 filed on Mar. 30, 2017, and claiming the priority of Japanese Patent Application No. 2016-093329 filed on May 6, 2016, the entire contents of which are herewith incorporated by reference.

TECHNICAL FIELD

The present invention relates to an exhaust gas recirculation valve provided in an exhaust recirculation passage which is configured to recirculate a part of exhaust air ejected from an engine into the engine as exhaust recirculation gas, the valve being used for regulating a flow rate of the exhaust recirculation gas.

BACKGROUND ART

For example, an exhaust gas recirculation valve (Exhaust Gas Recirculation Valve: EGR valve) provided with a double eccentric valve of the Patent Document 1 mentioned below has been known as this type of technique. This EGR valve includes a valve section consisting of a double eccentric valve. FIG. 12 is a sectional view of a valve section 61 in a valve fully-closed state. FIG. 13 is a sectional view of the valve section 61 in a valve open state in a small opening range. FIG. 14 is a sectional view of the valve section 61 in a valve fully open state. The valve section 61 includes a valve housing 63 provided inside with a passage 62, and in the passage 62, a valve seat 64, a valve element 65, and a leading end portion of a rotary shaft 66 are placed. The rotary shaft 66 has a free end on its distal end provided with a pin 66a and is supported in cantilever configuration by the valve housing 63. The valve element 65 is fixed to the pin 66a. In FIGS. 12 to 14, the passage 62 located on an upper side of the valve seat 64 corresponds to an upstream side of EGR gas flow, and the passage 62 located on a lower side of the valve seat 64 corresponds to a downstream side of the EGR gas flow.

Specifically, as shown in FIGS. 12 to 14, the valve seat 64 of an annular shape includes a valve hole 67 and an annular seat surface 67a formed on an edge of the valve hole 67. The valve element 65 of a circular disc shape includes an annular sealing surface 65a on an outer periphery corresponding to the seat surface 67a of the valve seat 64. The pin 66a has an axis Lp extending in parallel with an axis L1 of the rotary shaft 66 and being positioned eccentrically in a radial direction of the rotary shaft 66. From the valve fully-closed state in FIG. 12 in which the valve element 65 is seated on the valve seat 64, rotation of the rotary shaft 66 about the axis L1 leads to rotation of the valve element 65 in a valve opening direction as shown in FIG. 13, and thus the sealing surface 65a is moved away from the seat surface 67a to open the passage 62. Subsequently, the valve element 65 is further rotated to be in the valve fully-open state as shown in FIG. 14.

The annular valve seat 64 is press-fitted in a step portion 62a formed in the passage 62. Under this press-fitted state, the valve seat 64 has an annular flat upper face 64a located adjacent to the seat surface 67a. The upper face 64a is positioned to face the passage 62. However, a flat lower face 64b of the valve seat 64 does not face the passage 62 since the flat lower face 64b is press-fitted in the step portion 62a.

RELATED ART DOCUMENTS

Patent Documents

Patent Document 1: JP5759646B

SUMMARY OF INVENTION

Problems to be Solved by the Invention

The EGR valve of the Patent Document 1 is configured such that the flat upper face 64a adjacent to the seat surface 67a of the valve seat 64 faces the passage 62. While the valve element 65 is under the process of valve opening from the valve fully-closed state, a right-side part (a first side part) 71 of the valve element 65 rotates downward from the seat surface 67a of the valve seat 64 and a left-side part (a second side part) 72 of the valve element 65 rotates upward from the seat surface 67a of the valve seat 64 as shown in. FIGS. 12 and 13. At the same time with the valve opening, the second side part 72 of the valve element 65 starts to move toward an upstream side of the passage 62 from the upper face 64a of the valve seat 64 as shown in FIG. 13. On the other hand, after the valve starts opening, the first side part 71 of the valve element 65 moves between the upper face 64a and the lower face 64b of the valve seat 64 in a determined opening range (the small opening range), and subsequently, the first side part 71 moves toward the downstream side of the lower face 64b of the valve seat 64. Accordingly, in the small opening range directly after start of valve opening, an opening area SB of the second side part 72 of the valve element 65 becomes larger than an opening area SA of the first side part 71 as shown in FIG. 13. Accordingly, in the small opening range, improvement in a flow-rate angular resolution (resolution of the EGR gas flow rate with respect to a rotation angle of the valve element 65) of the EGR gas has not been enough. In a large opening range (in the valve fully-open state) over the small opening range, on the other hand, the EGR gas having been flowing from the upstream side passes through the valve seat 64 and the valve element 65 as shown in FIG. 14, but a corner portion of an inner edge of the upper face 64a of the valve seat 64 causes separation of the EGR gas flow, so that pressure loss of the EGR gas is increased. Therefore, the flow rate of the EGR gas passing through the EGR valve has not been increased enough.

The present invention has been made in view of the above circumstances to provide an exhaust gas recirculation valve that can achieve improvement in a flow-rate angular resolution of the exhaust recirculation gas in a small opening range and achieve increase in a flow rate of the exhaust recirculation gas in a large opening range.

Means of Solving the Problems (1) To achieve the above purpose, one aspect of the present invention provides an exhaust gas recirculation valve comprising: a housing; a passage provided in the housing and allowing exhaust gas recirculation gas to flow therein; a valve seat including a valve hole provided in the passage, the valve seat including an annular seat surface formed in the valve hole; a valve element provided in the passage and allowed to be seated on the valve seat, the valve element of a circular disc shape including an annular sealing surface on an outer periphery in correspondence with the seat surface; and a rotary shaft including an attachment part to which the valve element is attached, the rotary shaft being rotatable to open and close the valve element, the exhaust gas recirculation valve being configured to rotate the rotary shaft to rotate the valve element to perform valve opening operation from a valve fully-closed state where the valve element is seated on the valve seat and the sealing surface contacts the seat surface, wherein the valve hole of the valve seat includes an upstream-side flow rate regulation part radially expanded and tapered toward an upstream side of the EGR gas flow on an upstream side of the seat surface.

According to the above configuration (1), when the valve element is operated to open the valve from the valve fully closed state, a part of the valve element moves toward upstream of the seat surface of the valve seat. At this time, in a small opening range of a valve opening degree, a part of the valve element moves with facing the upstream-side flow rate regulation part, and in a middle opening range and a large opening range over the small opening range, a part of the valve element moves upstream of the valve hole. Accordingly, in the small opening range, a flow rate of the exhaust gas recirculation gas is narrowed to a minute amount in the valve hole upstream of the seat surface between the valve element and the upstream-side flow rate regulation part of the valve hole. In the middle opening range and the large opening range, the exhaust gas recirculation gas is free from narrowing of the flow rate, and thus the EGR gas is guided smoothly toward the downstream side in the upstream-side flow rate regulation part. Namely, in the middle opening range and the large opening range, separation of the EGR gas flow is lowered and the pressure loss of the EGR gas is reduced.

(2) To achieve the above purpose, in the above configuration (1), preferably, the valve element is partitioned into a first side part and a second side part with respect to a boundary defined by a virtual plane extending along an axis of the rotary shaft and configured to perform the valve opening operation from the valve fully-closed state such that the first side part rotates toward a downstream side of the exhaust gas recirculation gas from the seat surface and the second side part rotates toward the upstream-side flow rate regulation part from the seat surface, and assuming that a valve open degree of valve element in the valve fully-closed state is defined as 0% and the valve opening degree of the valve element in the valve fully-open state is defined as 100% after gradual increase in the valve open degree according to the valve opening operation of the valve element, a height dimension of the upstream side flow rate regulation part in an axial direction of the valve hole is defined by the valve open degree at the time when the sealing surface of the second side part starts to move upstream of the upstream-side flow rate regulation part, and the valve open degree is set in a range of 30% to 40%.

According to the above configuration (2), in addition to the operation of the above configuration (1), a height dimension of the upstream-side flow rate regulation part of the valve hole is set in a range of 30% to 40% of the valve opening degree of the valve element. Accordingly, the valve opening degree of 30% to 40% is determined to be the small opening range, and the flow rate of the exhaust gas recirculation gas is narrowed in this range. On the other hand, the valve opening degree more than 40% is determined to be the middle opening range or the large opening range. Accordingly, the exhaust gas recirculation gas is smoothly guided downstream in this range in the upstream-side flow rate regulation part.

To achieve the above purpose, in the above configuration (1) or (2), preferably, the valve hole of the valve seat includes an inner diameter pan having the smallest diameter, the inner diameter part being positioned on a downstream side of the exhaust gas recirculation gas flow downstream of the seat surface and includes a downstream-side flow rate regulation part positioned downstream of the inner diameter part, the downstream-side flow rate regulation part being formed radially expanded and tapered toward the downstream side.

According to the above configuration (3), in addition to the operation of the above configuration (1) or (2), a part of the valve element moves downstream of the seat surface of the valve hole when the valve element is operated to open the valve from the valve fully-closed state. At this time, a part of the valve element moves with facing the inner diameter part and the downstream-side flow rate regulation part, and then moves further downstream of the valve hole. Accordingly, when a part of the valve element faces the inner diameter part and the downstream-side flow rate regulation part in the valve hole downstream of the seat surface, the flow rate of the exhaust gas recirculation gas is narrowed to a minute amount among the valve element, the inner diameter part, and the downstream-side flow rate regulation part. When a part of the valve element moves downstream of the valve hole, the exhaust gas recirculation gas is smoothly guided downstream in the inner diameter part and the downstream-side flow rate regulation part.

(4) To achieve the above purpose, in the above configuration (3), preferably, a first angle formed by the seat surface and the upstream-side flow rate regulation part, a second angle formed by the seat surface and the inner diameter part, and a third angle formed by the inner diameter part and the downstream-side flow rate regulation part are each set for 20° or less in an axial direction of the valve hole.

According to the above configuration (4), in addition to the above configuration (3), the first angle, the second angle and the third angle are each set as 20° or less, and thus a boundary of the seat surface and the upstream-side flow rate regulation part, a boundary of the seat surface and the inner diameter part, and a boundary of the inner diameter part and the downstream-side flow rate regulation part are each formed to be a relatively gentle corner. These gentle corners achieve reduction in separation of the exhaust gas recirculation gas and reduction in the pressure loss of the exhaust gas recirculation gas.

Effects of the Invention

According to the above configuration (1), the exhaust gas recirculation valve can achieve improvement in the flow-rate angular resolution of the exhaust gas recirculation gas in the small opening range and further achieve increase in the flow rate of the exhaust gas recirculation gas in the middle opening range and the large opening range.

According to the above configuration (2), in addition to the effect of the above configuration (1), the exhaust gas recirculation valve can achieve improvement in the flow-rate angular resolution of the exhaust gas recirculation gas in the small opening range where the valve opening degree is in the range of 30% to 40% in the valve hole upstream of the seat surface and further achieve increase in the exhaust gas recirculation gas in the middle opening range and the large opening range where the valve opening degree exceeds 40%.

According to the above configuration (3), with regard to the effects of the above configurations (1) and (2), the exhaust gas recirculation valve can achieve further improvement in the flow-rate angular resolution of the exhaust gas recirculation gas in the small opening range and achieve further increase in the flow rate of the exhaust gas recirculation gas in the middle opening range and in the large opening range.

According to the above configuration (4), with regard to the effect of the above configuration the exhaust gas recirculation valve can achieve further increase in the flow rate of the exhaust gas recirculation gas in the middle opening range and in the large opening range.

Figure 10:
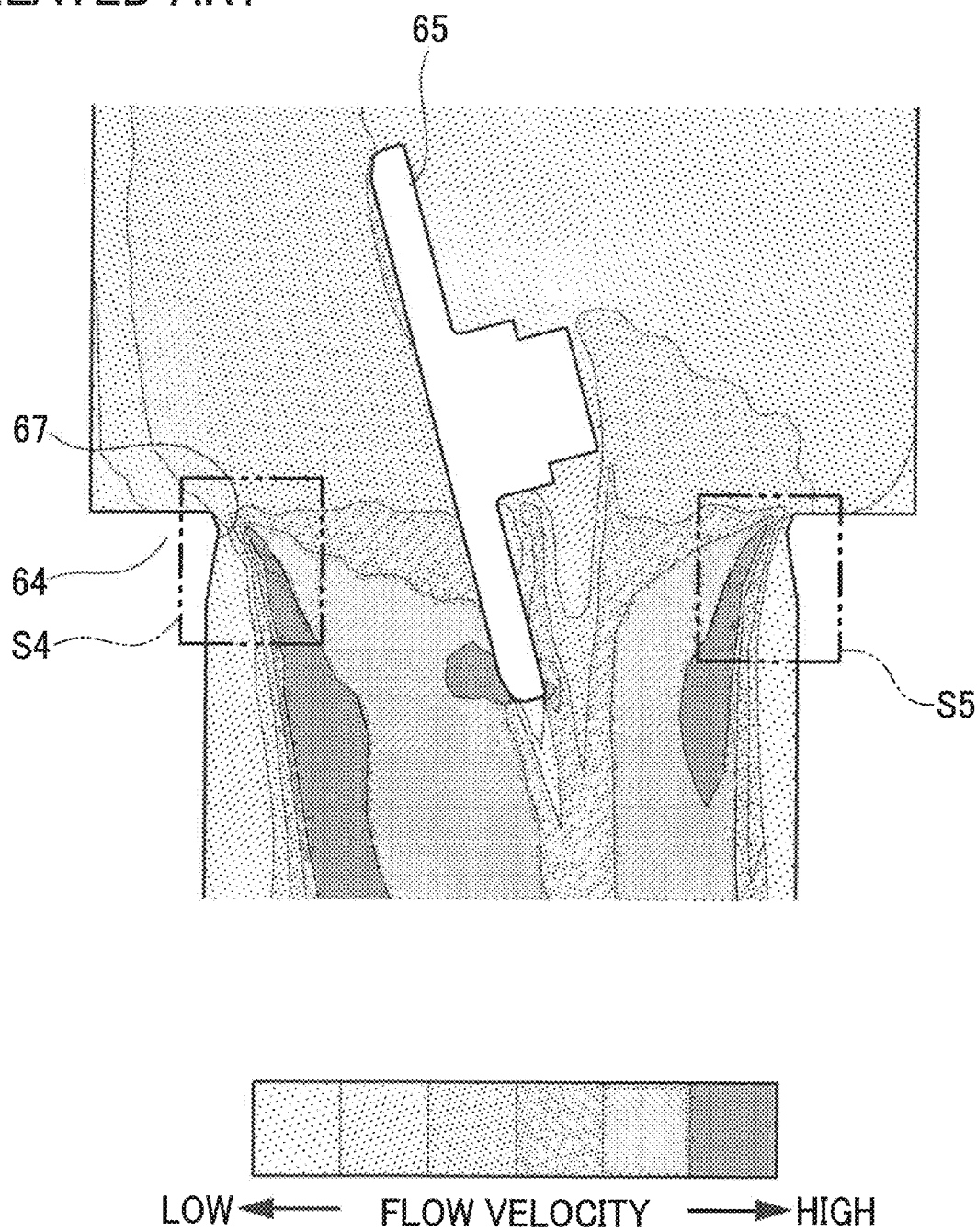
Figure 11:
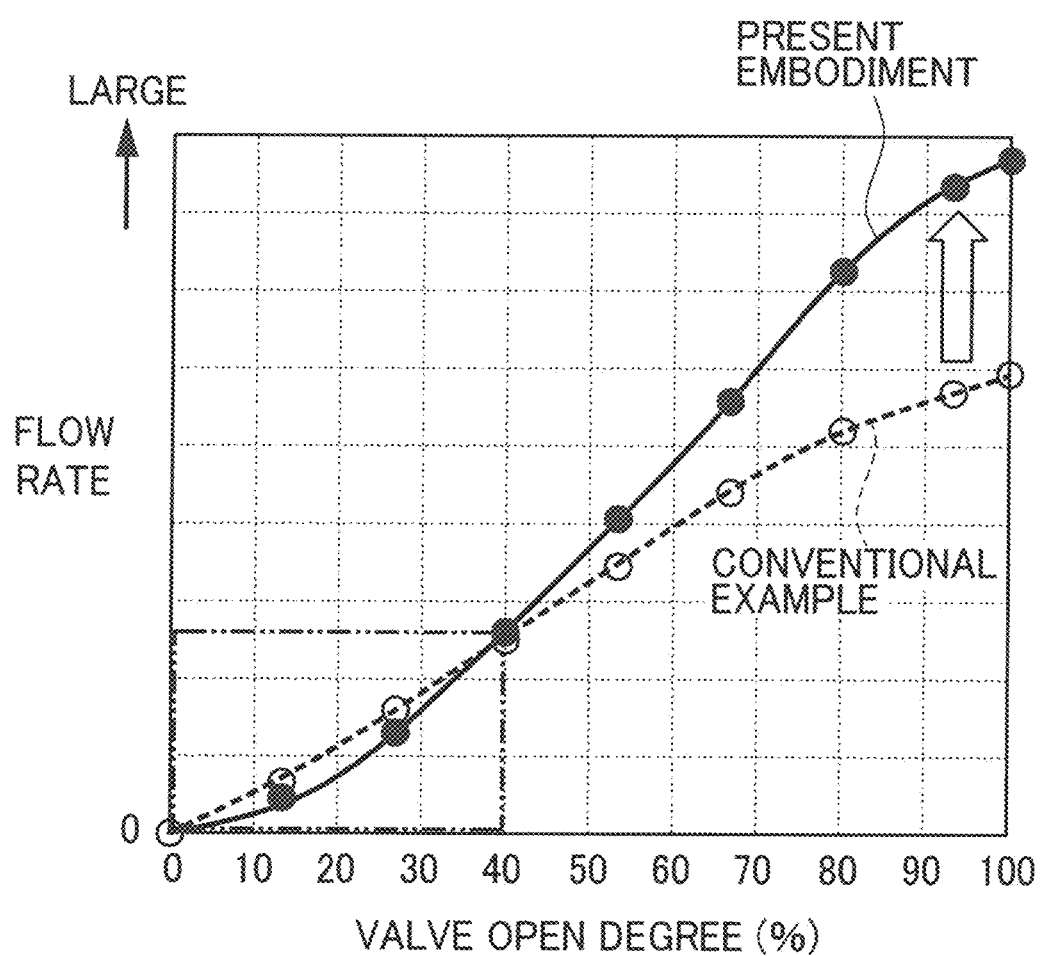
Figure 12:
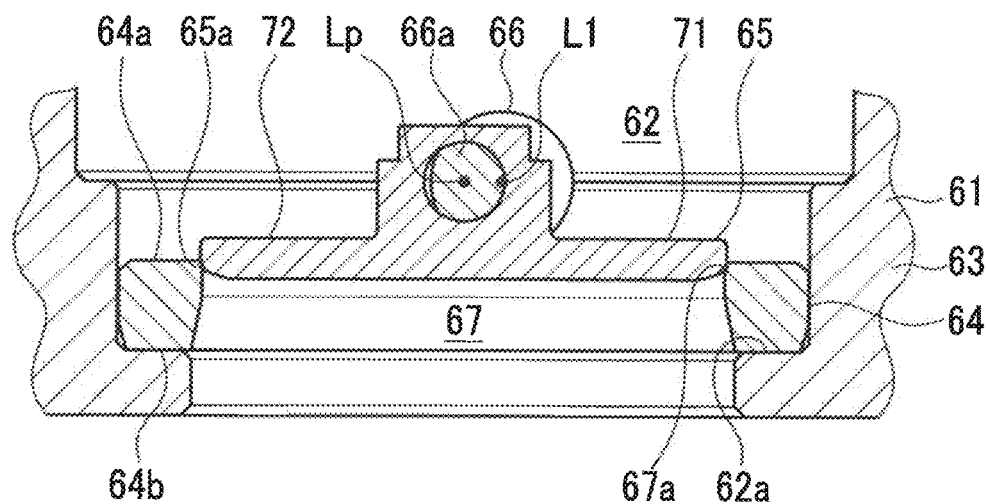
Figure 13:
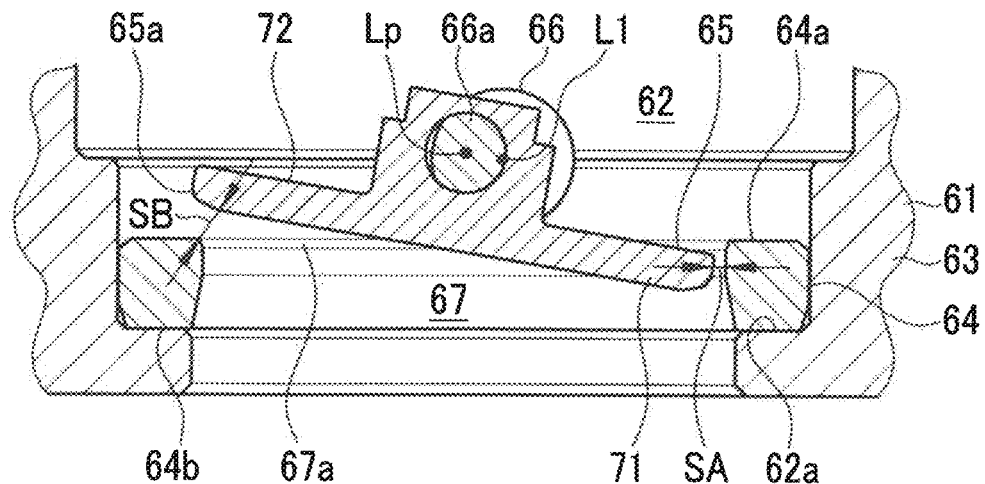
Figure 14:
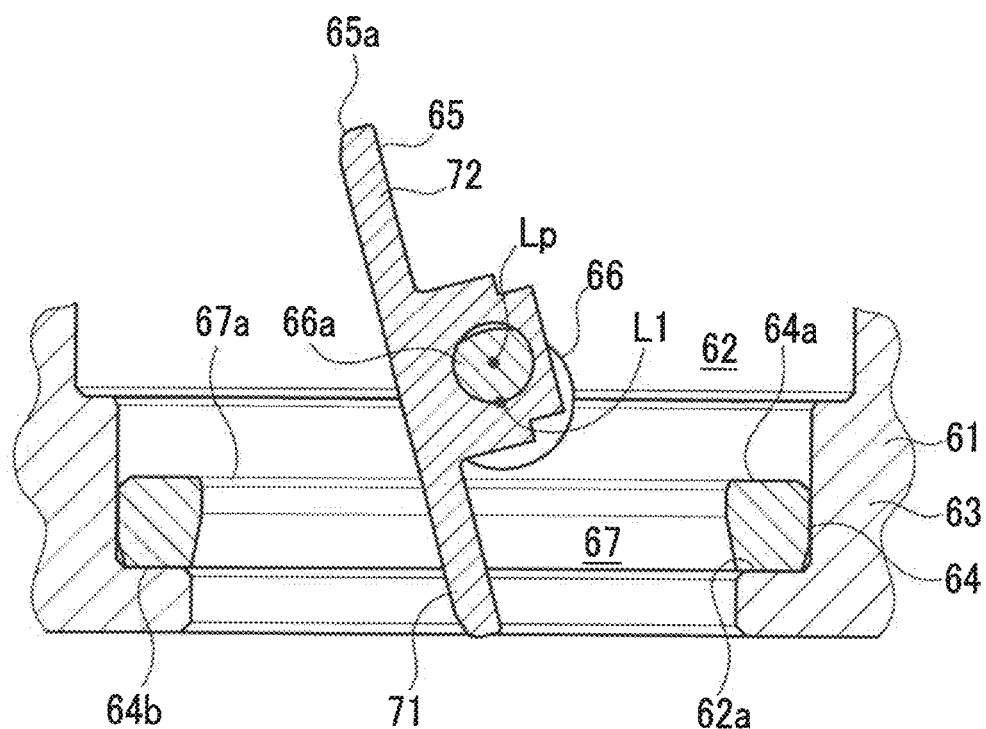

FIG. is an analysis diagram illustrating a flow velocity distribution of EGR gas in the valve section in the valve fully-open state in the embodiment;

FIG. 10 is an analysis diagram illustrating the flow velocity distribution of the EGR gas in the valve section in the valve fully-open state in a comparative example of the present embodiment;

FIG. 11 is a graph illustrating flow rate characteristics of the EGR gas with respect to a valve open degree of the EGR valve in the embodiment;

FIG. 12 is a sectional view of a valve section in a valve fully-closed state in a conventional example; and FIG. 13 is a sectional view of the valve section in a valve open state in a small opening range in the conventional example; and FIG. 14 is a sectional view of the valve section in a valve fully-open state in the conventional example.

MODE FOR CARRYING OUT THE INVENTION

One embodiment embodying an exhaust gas recirculation valve (EGR valve) of the present invention is explained in detail below with reference to the accompanying drawings.

The EGR valve of the present embodiment is provided in an exhaust gas recirculation passage (EGR passage) to recirculate a part of exhaust air, which is discharged out from an engine to an exhaust passage, into an intake passage as exhaust gas recirculation gas (EGR gas), and the EGR valve is used for regulating a flow rate of the EGR gas. The EGR valve consists of a motor-operated valve allowed to change its opening degree. This EGR valve adopts, for example, a configuration of "a double eccentric valve" described in JP Patent No. 5759646 as a basic structure having characteristics of a large flow rate, high responsiveness, and high resolution.

Figure 1:
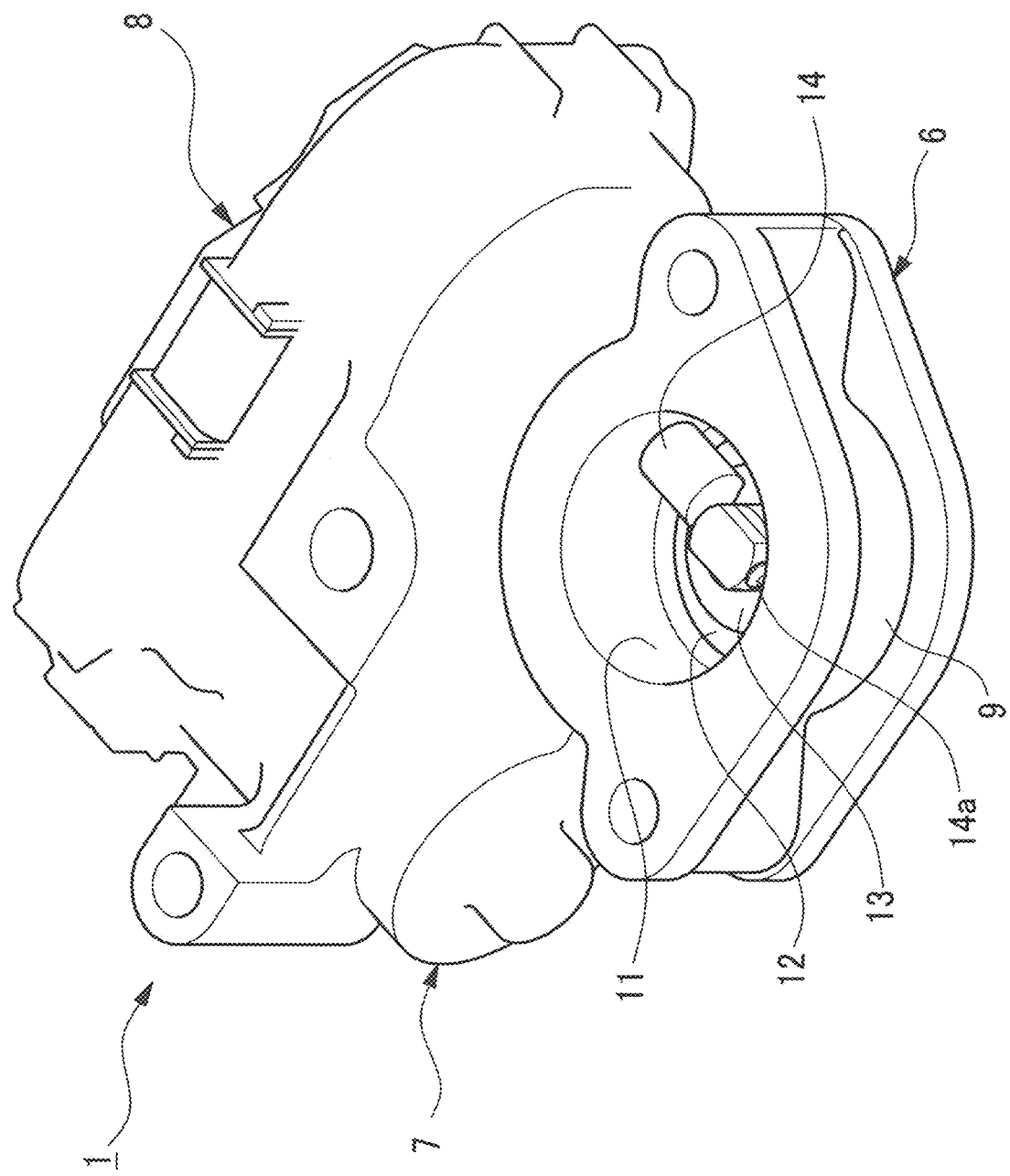
FIG. 1 is a perspective view of an EGR valve in an embodiment.

FIG. 1 is a perspective view of an EGR valve 1 of the present embodiment. The EGR valve 1 includes a valve section 6 consisting of a double eccentric valve, a motor section 7 mounted with a motor 22 (see FIG. 4), and a speed reducing mechanism section mounted with a plurality of gears 31 to 33 (see FIG. 4). The valve section 6 includes a pipe 9 provided with a passage 11 in which the EGR gas flows. In the passage 11, a valve seat 12, a valve element 13, and a part of a rotary shaft 14 are placed. To the rotary shaft 14, a rotational force of the motor 22 (see FIG. 4) is made to be transmitted via the plurality of gears 31 to 33 (see FIG. 4).

Figure 2:
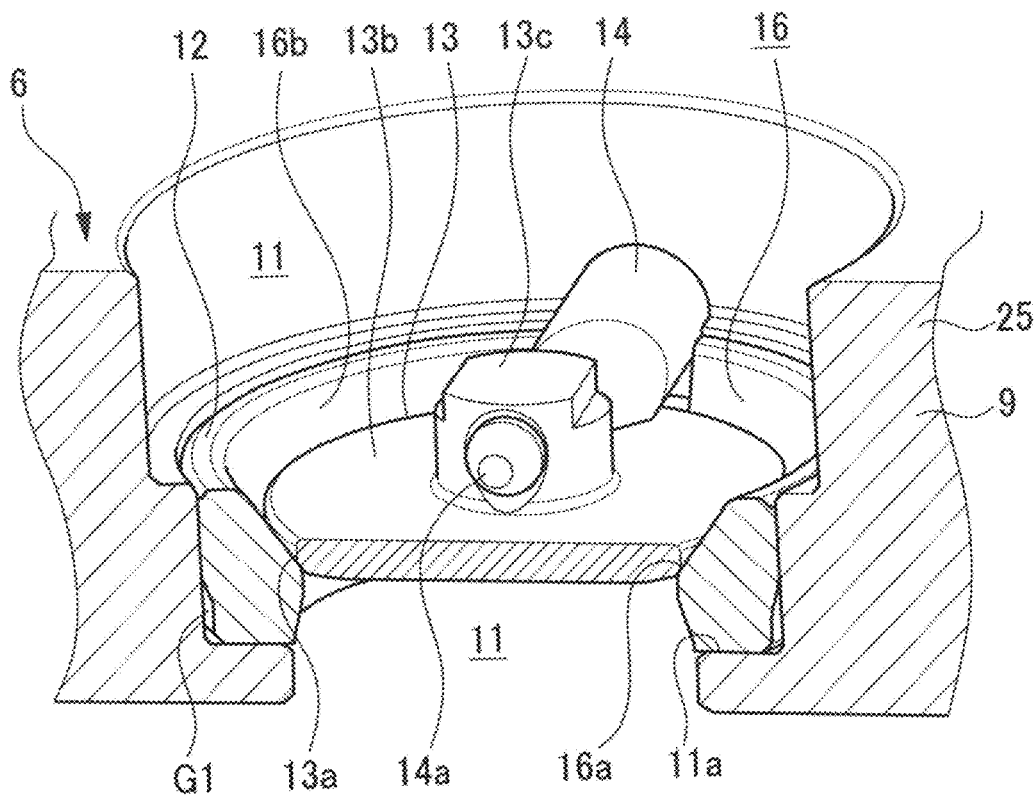
FIG. 2 is a partially-cutaway perspective view of a valve section in a valve fully-closed state in the embodiment.
Figure 3:
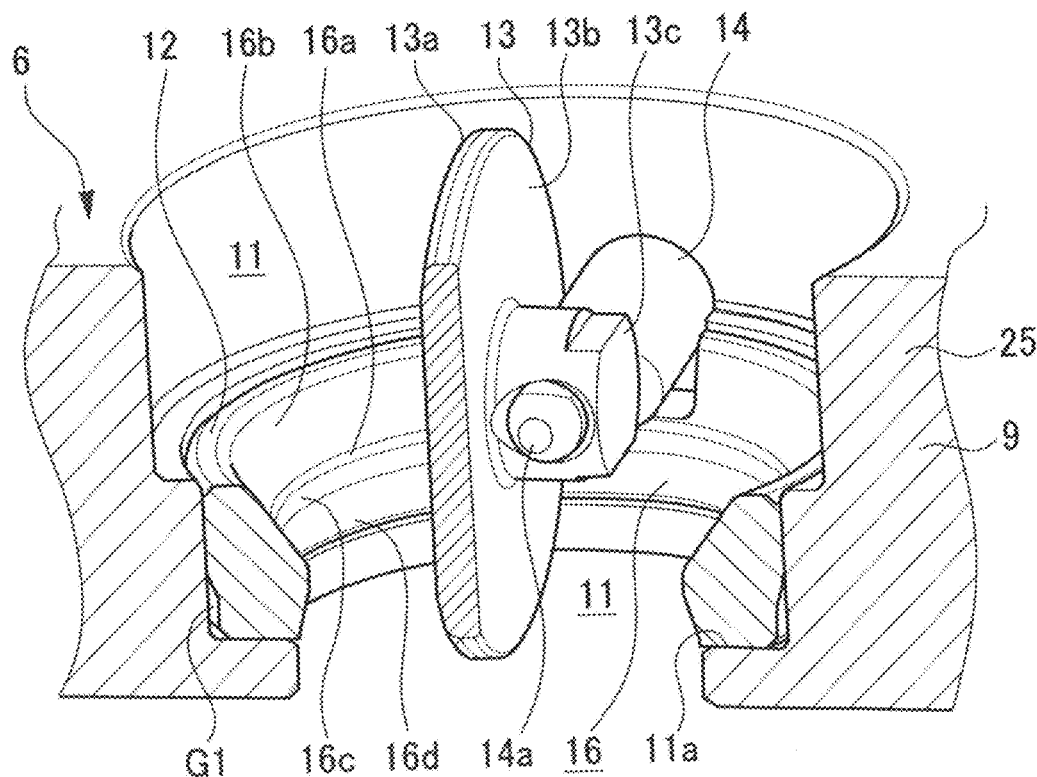
FIG. 3 is a partially-cutaway perspective view of the valve section in a valve fully-open state in the embodiment.

FIG. 2 is a partially-cutaway perspective view of the valve section 6 in a valve fully-closed state where the valve element 13 is seated on the valve seat 12. FIG. 3 is a partially-cutaway perspective view of the valve section 6 in a valve fully-open state where the valve element 13 is furthest away from the valve seat 12. As shown in FIGS. 2 and 3, the passage 11 is formed with a step portion 11a in which the valve seat 12 is press-fitted and fixed. The valve seat 12 in an annular shape has a valve hole 16 in its center. The valve hole 16 has an annular seat surface 16a in its axially middle part. The valve element 13 allowed to be seated on the valve seat 12 has a circular disc shape and is formed on tis outer periphery with an annular sealing surface 13a in correspondence with the seat surface 16a. The valve element 13 is fixed to a distal end of the rotary shaft 14 to be integrally rotated with the rotary shaft 14. The rotary shaft 14 includes a pin 14a on its distal end as an attachment part which is attached with the valve element 13, and the rotary shaft 14 is configured to rotate to open or close the valve element 13. In FIGS. 2 and 3, the passage 11 on an upper side of the valve seat 12 indicates an upstream side of the EGR gas flow, and the passage 11 on a lower side of the valve seat 12 indicates a downstream side of the EGR gas flow. In the present embodiment, the valve element 13 is placed on the upstream side of the passage 11. The EGR valve 1 is configured such that the rotary shaft 14 rotates from the valve fully-closed state where the valve element 13 is seated on the valve seat 12 and the sealing surface 13a contacts the seat surface 16 as shown in FIG. 2 and that the valve element 13 accordingly rotates to open the valve to the valve fully-open state as shown in FIG. 3.

Figure 4:
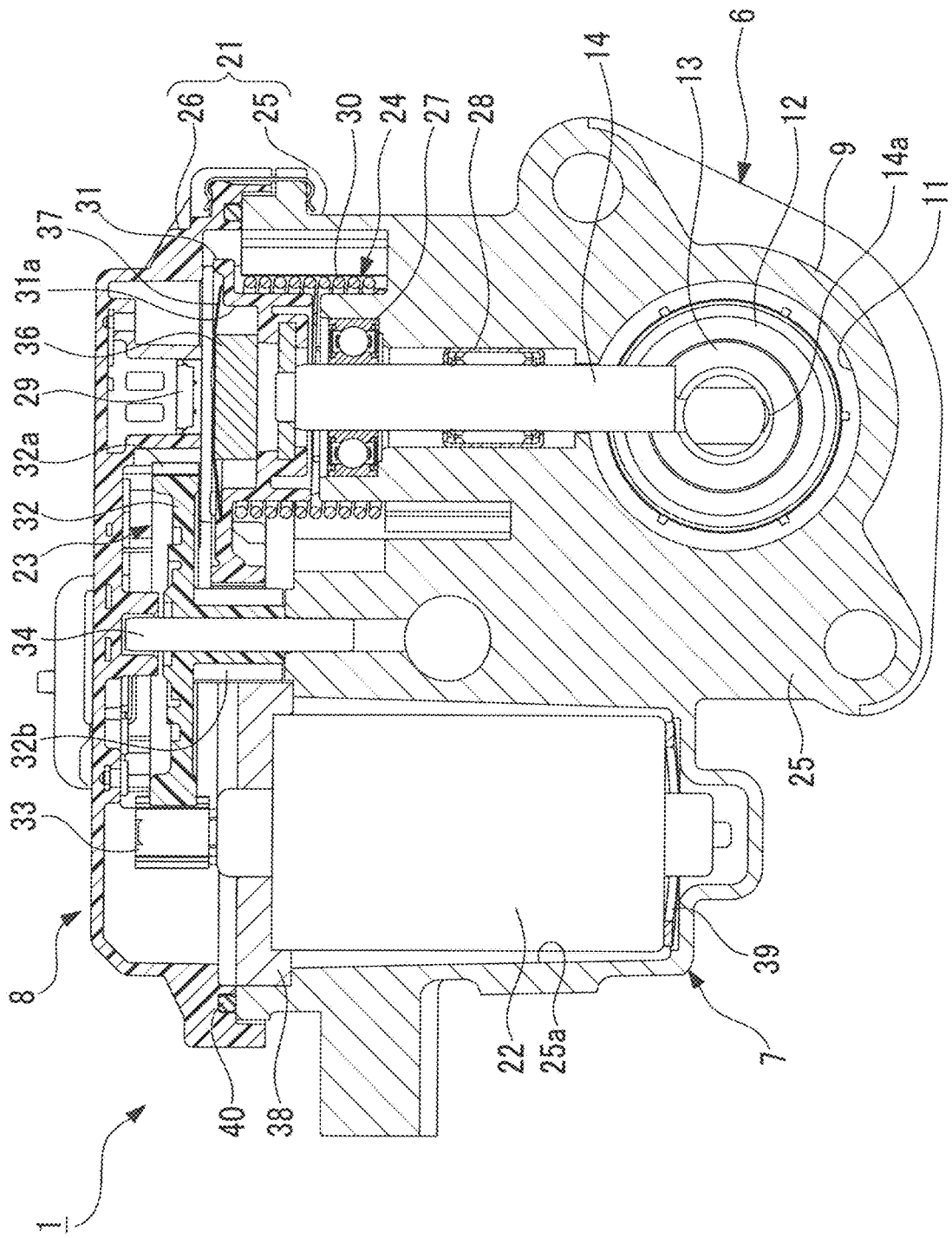
FIG. 4 is a plane sectional view of the EGR valve in the valve fully-closed state in the embodiment.

FIG. 4 is a plane sectional view of the EGR valve 1 in the valve fully-closed state. The EGR valve 1 is provided with a body 21, the motor 22, as speed reducing mechanism 23, and a return mechanism 24 as main elements other than the valve seat 12, the valve element 13, and the rotary shaft 14. In the present embodiment, the body 21 is provided with an aluminum valve housing 25, which includes the passage 11 and the pipe 9, and a synthetic-resin made end frame 26 enclosing an open end of the valve housing 25. The rotary shaft 14 and the valve element 13 are provided in the valve housing 25. The rotary shaft 14 includes the pin 14a protruding from the distal end. The rotary shaft 14 has a free end on its distal end provided with the pin 14a, and this distal end is placed in the passage 11. The rotary shaft 14 is supported in cantilever configuration by the valve housing 25 in a rotatable manner via two bearings (a first bearing 27 and a second bearing 28) that are placed separately along a proximal end of the rotary shaft 14. The first bearing 27 is constituted by a ball bearing and the second bearing 28 is constituted by a needle bearing. The valve element 13 is fixed to the pin 14a and placed in the passage 11.

In FIG. 4, the end frame 26 is fixed to the valve housing 25 by a plurality of clips (not shown). Inside the end frame 26 is provided with an open degree sensor 29 placed in correspondence with a proximal end of the rotary shall 14 to detect an open degree of the valve element 13. This sensor 29 consists of a ball 1C or the like and is configured to detect a rotation angle of the rotary shaft 14 as the valve open degree. To a proximal end portion of the rotary shaft 14, a main gear 31 is fixed. Between the main gear 31 and the valve housing 25, a return spring 30 to urge the valve element 13 in a valve closing direction is provided. A recessed portion 31a is formed on a rear side of the main gear 31 and a magnet 36 is accommodated in the recessed portion 31a. The magnet 36 is pressed from its upper side and fixed to the main gear 31 by a retainer plate 37 formed of a leaf spring. By this configuration, integral rotation of the valve element 13 and the rotary shaft 14 leads to changes in a magnetic field of magnet 36, and the open degree sensor 29 detects changes in the magnetic field as the valve open degree.

In the present embodiment, the motor 22 is housed and fixed in an accommodation recess 25a formed in the valve housing 25. Namely, the motor 22 housed in the accommodation recess 25a is fixed to the valve housing 25 via a stopper plate 38 and a leaf spring 39 that are provided one in each of both ends of the accommodation recess 25a. The motor 22 is drivingly connected to the rotary shaft 14 thorough the speed reducing mechanism 23 to open and close the valve element 13, Namely, on an output shaft (not shown) of the motor 22, a motor gear 33 is fixed. The motor gear 33 is drivingly connected to the main gear 31 via an intermediate gear 32. The intermediate gear 32 is a two-stage gear including a large-diameter gear 32a and a small-diameter gear 32b. The intermediate gear 32 is rotatably supported by the valve housing 25 via a pin shaft 34. The large-diameter gear 32a is coupled with the motor gear 33 and the small-diameter gear 32b is coupled with the main gear 31. In the present embodiment, the main gear 31 and the intermediate gear 32 are made of resin material for weight reduction.

Further, as shown in FIG. 4, a rubber gasket 40 is provided in an engagement portion of the valve housing 25 and the end frame 26. The gasket 40 is placed over a circumferential groove formed on an outer periphery of an open end face of the end frame 26. The gasket 40 provided between the valve housing 25 and the end frame 26 thus hermetically encloses the motor section 7 and the speed reducing mechanism section 8 from atmosphere.

Accordingly, as shown in FIG. 2, when the motor 22 is electrified and operated to rotate the motor gear 33 from the valve fully-closed state of the valve element 13, rotation of the motor gear 33 is reduced its speed by the intermediate gear 32 and transmitted to the main gear 31. Thus, the rotary shaft 14 and the valve element 13 are rotated against an urging force of the return spring 30, thereby opening the passage 11. Namely, the valve element 13 is opened. For keeping the valve element 13 open by a certain open degree, the motor 22 is electrified to generate a rotational force, and the generated rotational force is transmitted as a retaining force to the rotary shaft 14 and the valve element 13 through the motor gear 33, the intermediate gear 32, and the main gear 31. This retaining force makes balance with the urging force of the return spring 30, keeping the certain open degree of the valve element 13.

Figure 5:
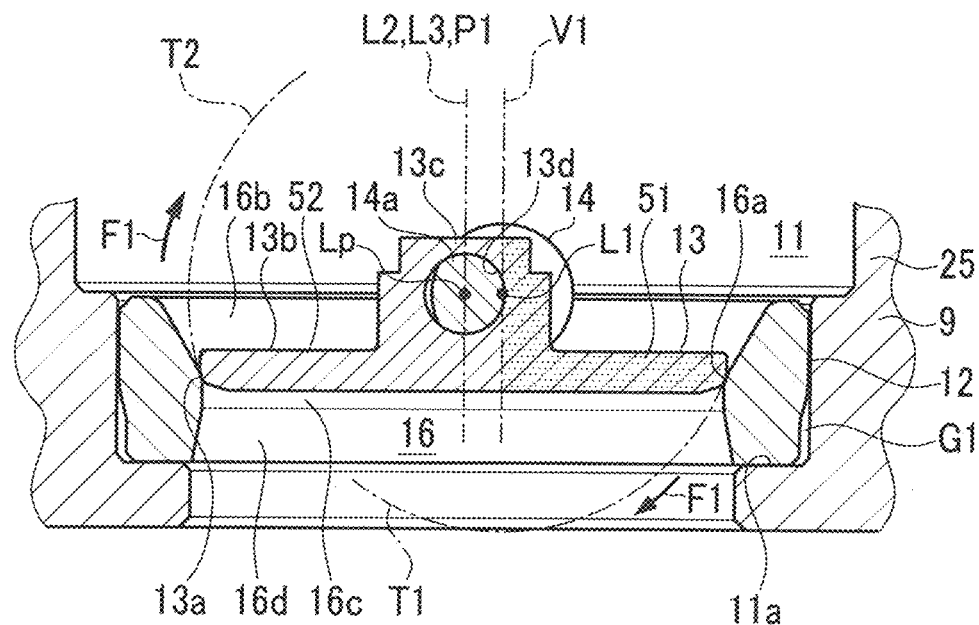
FIG. 5 is a sectional view of the valve section in the valve fully-closed state in the embodiment.
Figure 6:
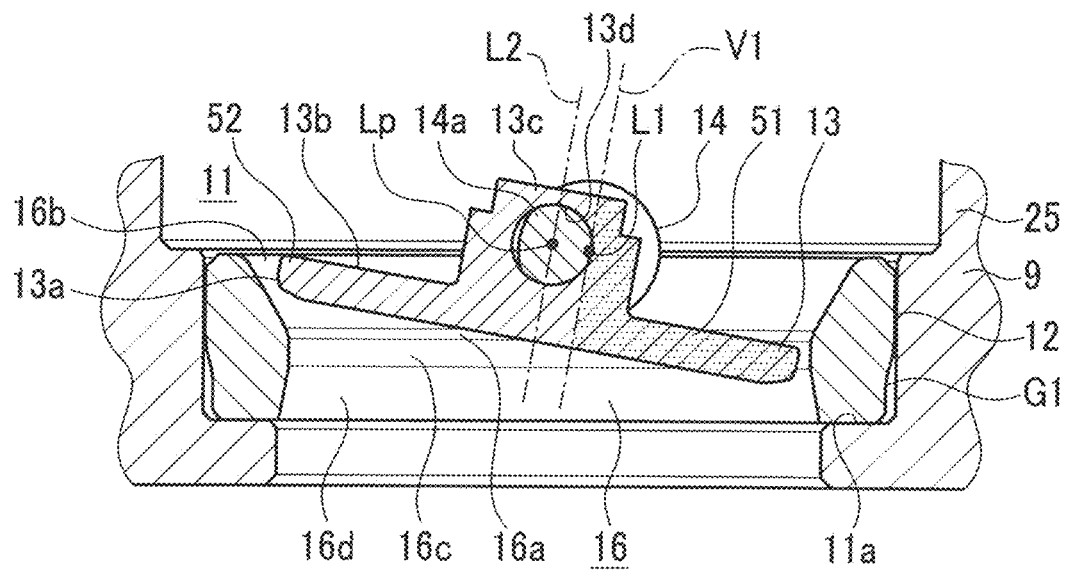
FIG. 6 is a sectional view of the valve section in a valve open state in a small opening range in the embodiment.
Figure 7:
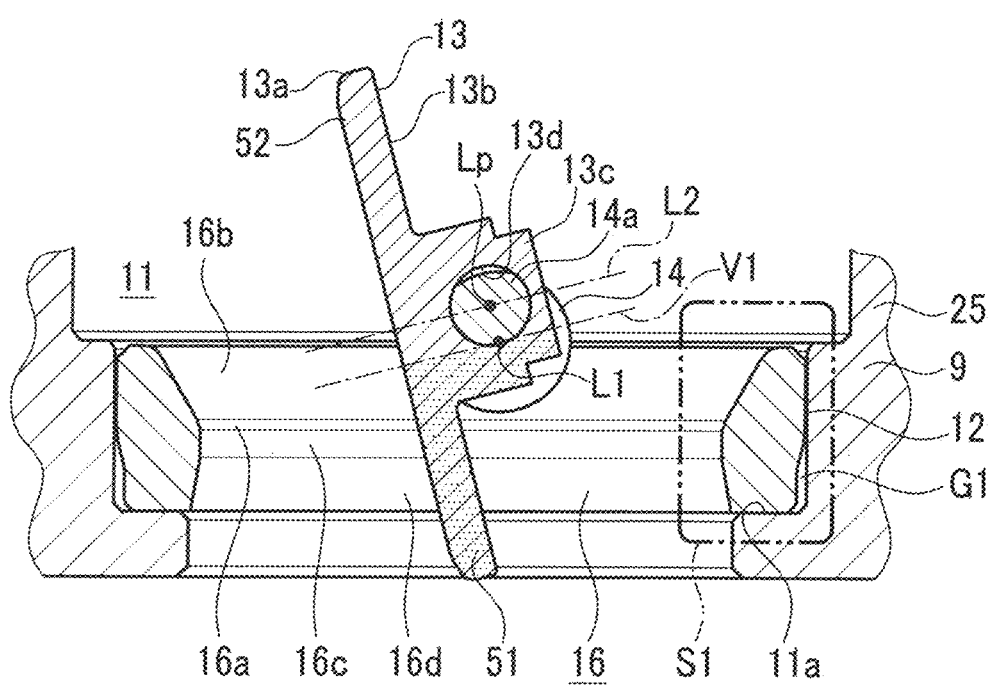
FIG. 7 is a sectional view of the valve section in the valve fully-open state in the embodiment.

FIG. 5 is a sectional view of the valve section 6 in the valve fully-closed state. FIG. 6 is a sectional view of the valve section 6 in the valve open state in the small opening range. FIG. 7 is a sectional view of the valve section 6 in the valve fully-open state. As shown in FIGS. 5 to 7, an axis L of the rotary shaft 14 extending in parallel with a radial direction of the valve element 13 and the valve hole 16 is positioned eccentrically from a center P1 of the valve hole 16 to a radial direction of the valve hole 16. Further, a center of the sealing surface 13a of the valve element 13 is positioned eccentrically from the axis L1 of the rotary shaft 14 to a (downward) direction where an axis L2 of the valve element 13 extends. The valve element 13 is configured to rotate with the rotary shaft 14 about axis L1 of the rotary shaft 14 so that the valve element 13 is movable between a valve fully-closed position where the sealing surface 13a of the valve element 13 contacts with the seat surface 16a of the valve seat 12 (see FIG. 5) and a valve fully-open position where the sealing surface 13a is furthest away from the seat surface 16a (see FIG. 7).

As shown in FIGS. 5 to 7, the valve element 13 includes an almost columnar-shaped protrusion 13c protruding from a plate surface 13b and fixed to the rotary shaft 14. The protrusion 13c is fixed with the pin 14a on a position radially deviated from the axis L1 of the rotary shaft 14. The protrusion 13c is formed with an attachment hole 13d which the pin 14a is press-fitted, and thus the protrusion 13c is fixed with the pin 14a. The protrusion 13c is placed on the axis L2 of the valve element 13, arranging the valve element 13 including the protrusion 13c in a two-told rotational symmetry centered about the axis L2 of the valve element 13.

In the present embodiment, when the valve element 13 starts to rotate in a valve open direction (a direction indicated with an arrow F1 in FIG. 5, i.e., in a clockwise direction in FIG. 5) from the fully-closed state in FIG. 5, the scaling surface 13a of the valve element 13 concurrently starts to move away from the seat surface 16a of the valve seat 12 and starts to move along rotation tracks T1 and T2 about the axis L1 of the rotary shaft 14.

As shown in FIGS. 5 to 7, the valve element 13 is partitioned into two regions of a first side part 51 (a right side part indicated with dots in FIGS. 5 to 7) and a second side part 52 (a left side part indicated without dots in FIGS. 5 to 7) with respect to a boundary defined by a virtual plane V1 extending along the axis L1 of the rotary shaft 14 and extending in parallel with the axis L2 of the valve element 13. When the valve element 13 rotates in the valve open direction indicated with the arrow F1 from the valve fully-closed state in FIG. 5, the first side part 51 rotates toward the downstream side of the valve hole 16, and the second side part 52 rotates toward the upstream side of the valve hole 16. With this rotation of the valve element 13, the sealing surface 13a of the valve element 13 is made to rotate along the rotation tracks T1 and T2 about the axis L1 of the rotary shaft 14.

In the present embodiment, the annular valve seat 12 is press-fitted in the step portion 11a formed in the passage 11 as shown in FIGS. 2, 3, and 5 to 7, and thus the valve seat 12 is fixed to the valve housing 25 in the passage 11. Under this press-fitted state, a clearance G1 is formed between an outer circumferential lower part of the valve seat 12 and the valve housing 25. In the present embodiment, this clearance G1 is provided by forming a dent on the outer circumferential lower part of the valve seat 12.

Figure 8:
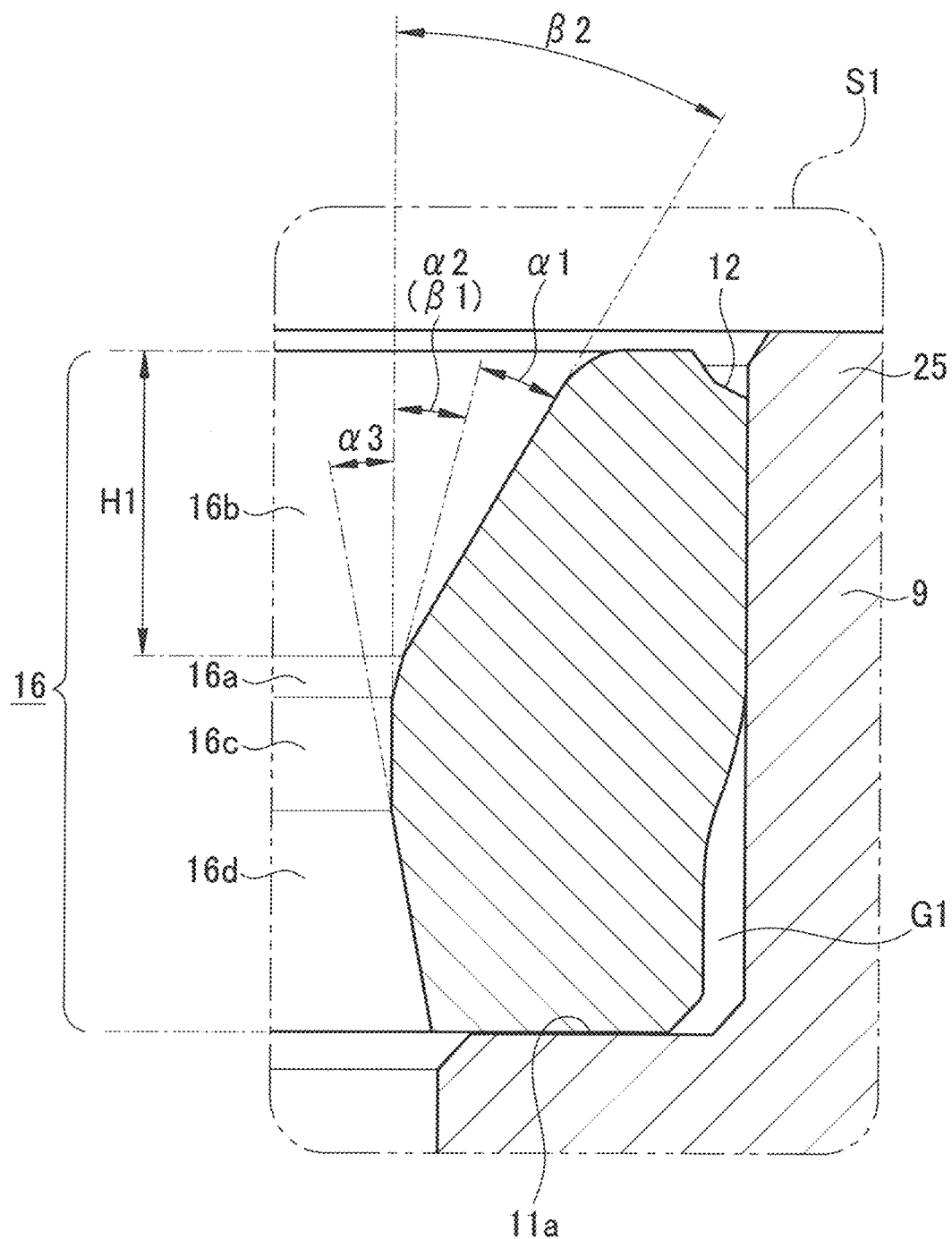
FIG. 8 is an enlarged sectional view of a portion encompassed with a chain-dot rectangle in FIG. 7 in the embodiment.

A configuration of the valve hole 16 of the valve seat 12 is now explained in detail. FIG. 8 is an enlarged sectional view of a portion encompassed with a chain-dot rectangle S1 in FIG. 7. As shown in FIG. 8, the valve seat 12 is shaped to narrow its middle part in a direction along an axis L3 of the valve hole 16. The seat surface 16a is formed in this middle part. The valve hole 16 includes a tapered upstream-side flow rate regulation part 16b radially expanding toward the upstream side. The valve hole 16 further includes an inner diameter part 16c having the smallest diameter and a tapered downstream-side flow rate regulation part 16d located downstream of the inner diameter part 16c and radially expanding toward the downstream side. As shown in FIGS. 2, 3, and 5 to 7, the seat surface 16a of the valve seat 12 and the sealing surface 13a of the valve element 13 are each shaped to be a uniform shape over the entire circumferences of each of the valve hole 16 and the valve element 13. To be specific, a width and a sectional shape of the seat surface 16a and a width and a sectional shape of the sealing surface 13a are each shaped to be uniform over the entire circumferences of the valve hole 16 and the valve element 13. The same applies to the upstream-side flow rate regulation part 16b, the inner diameter part 16c, and the downstream-side flow rate regulation part 16d of the valve hole 16.

In a direction of the axis L3 of the valve hole 16, a first angle $\alpha 1$ formed by the seat surface 16a and the upstream-side flow rate regulation part 16b, a second angle $\alpha 2$ formed by the seat surface 16a and the inner diameter part 16c, and a third angle $\alpha 3$ formed by the inner diameter part 16c and the downstream-side flow rate regulation part 16d are each set for 20° or less. The second angle $\alpha 2$ corresponds to an angle (a seat surface angle) $\beta 1$ of the seat surface 16a with respect to the axis L3 of the valve hole 16, and a sum of the first angle $\alpha 1$ and the second angle $\alpha 2$ similarly corresponds to an angle $\beta 2 (>\beta 1)$ of the upstream-side flow rate regulation part 16b with respect to the axis L3 (an upstream-side flow rate regulation part angle). In the present embodiment, the seat surface angle $\beta 1$ may be set in a range of 10° to 30°.

In the present embodiment, when the valve element 13 is operated to open from the valve fully-closed state as shown in FIGS. 5 to 7, the first side part 51 is configured to rotate toward the downstream-side flow rate regulation part 16d from the seat surface 16a and the second side part 52 is configured to rotate toward the upstream side flow rate regulation part 16b from the seat surface 16a. Herein, the valve open degree of the valve element 13 in the valve fully-closed state is defined as "0%." This valve open degree increases according to an opening movement of the valve element 13, and the valve open degree of the valve element 13 in the valve fully-open state is defined as "100%." The upstream-side flow rate regulation part 16b has a height H1 in the axis L3 direction of the valve hole 16, and this height H1 is determined according to the valve open degree of the valve element 13 at the time when the sealing surface 13a of the second side part 52 starts to move toward the passage 11 upstream of the upstream-side flow rate regulation part 16b. The valve open degree at that time is set in a range of "30% to 40%." In the present embodiment, for example, the degree is set for "40%."

According to the above-explained configuration of the EGR valve 1 in the present embodiment, the valve element 13 rotates about the axis L1 of the rotary shaft 14 to move between the valve fully-closed position where the sealing surface 13a of the valve element 13 contacts the seat surface 16a of the valve seat 12 and, the valve fully-open position where the sealing surface 13a is furthest away from the seat surface 16a. In a state where the valve element 13 is in the valve fully-closed position (the valve fully-closed state), the valve hole 16 of the valve seat 12 is closed by the valve element 13 and the EGR gas flow in the valve hole 16 is shut off. At this time, the sealing surface 13a and the seat surface 16a contact each other to hermetically close the valve element 13 with the valve seat 12, and thus the EGR gas leakage is prevented without providing any special elastic member for pressing the valve seat 12 against the valve element 13. In other words, with no need to provide any special elastic member for pressing the valve element 13 against the valve seat 12, only the configuration of the seat surface 16a of the valve seat 12 and the sealing surface 13a of the valve element 13 is enough to ensure sealing performance of the EGR valve 1 in the valve fully-closed state.

According to the configuration of the present embodiment, when the valve element 13 rotates to open from the valve fully-closed state, a part (the second side part 52) of the valve element 13 moves from the seat surface 16a of the valve seat 12 to the upstream side. At this time, in the small opening range of the valve open degree, the second side part 52 of the valve element 13 moves with facing the upstream-side flow rate regulation part 16b, and in the intermediate opening range and the large opening range over the small opening range, the second side part 52 moves upstream of the valve hole 16. Accordingly, in the valve hole 16 upstream of the seat surface 16a, the EGR gas flow rate is narrowed to a minute mount in the small opening range between the valve element 13 and the upstream-side flow rate regulation part 16b. In the intermediate opening range and in the large opening range, narrowing of the flow rate is released, and the EGR gas is smoothly guided to downstream in the upstream-side flow rate regulation part 16b. Namely, in the intermediate range and in the large opening range, separation of the EGR gas flow is lowered and pressure loss of the EGR gas is reduced. Thus, the EGR valve 1 can achieve improvement in the flow-rate angular resolution of the EGR gas in the small opening range and achieve increase in the EGR gas flow rate in the intermediate range and in the large opening range.

According to the configuration of the present embodiment, the height H1 of the upstream-side flow range regulation part 16b is set as 40% of the valve open degree of the valve element 13. The small opening range is accordingly defined with the valve open degree of 40% or less and the EGR gas flow rate is narrowed in this range. On the other hand, the intermediate opening range and the large opening range are defined with the valve open degree of more than 40% and the EGR gas is smoothly guided to the downstream side in these ranges by the upstream-side flow rate regulation part 16b. Therefore, in the valve hole 16 upstream of the seat surface 16a, the flow-rate angular resolution of the EGR gas is improved in the small opening range with 40% or less of the valve open degree, and the EGR gas flow rate is increased in the large opening range with the valve open degree of more than 40%.

According to the configuration of the present embodiment, the inner diameter part 16c and the downstream-side flow rate regulation part 16d are placed downstream of the seat surface 16a in the valve hole 16 of the valve seat 12, and thus, when the valve element 13 is operated to open the valve from the valve fully-closed state, a part (the first side part 51) of the valve element 13 moves toward the downstream side from the seat surface 16a of the valve hole 16. At this time the first side part 51 of the valve element 13 moves with facing the inner diameter part 16c and the downstream-side flow rate regulation part 16d, and then the first side part 51 further moves downstream of the valve hole 16. Accordingly, when the first side part 51 of the valve element 13 faces the inner diameter part 16c and the downstream-side flow rate regulation part 16d in the valve hole 16 downstream of the seat surface 16a, the EGR gas flow rate is further narrowed to be more minute among the valve element 13, the inner diameter part 16c, and the downstream-side flow rate regulation part 16d. When the first side part 51 further moves downstream of the valve hole 16, the EGR gas is smoothly guided toward the downstream side in the inner diameter part 16c and the downstream-side flow rate regulation part 16d. The EGR valve 1 can thus achieve further improvement in the flow-rate angular resolution of the EGR gas in the small opening range and achieve further increase in the EGR gas flow rate in the intermediate range and in the large opening range.

According to the configuration of the present embodiment, each of the first angle α1, the second angle α2, and the third angle α3 is set for 20° or less, so that a boundary of the seat surface 16a and the upstream-side flow rate regulation part 16b, a boundary of the seat surface 16a and the inner diameter part 16c, and a boundary of the inner diameter part 16c and the downstream-side flow rate regulation part 16d are each formed to be a relatively gentle corner. This configuration prevents separation of the EGR gas flow in these corners, lowering the pressure loss of the exhaust gas recirculation gas. Therefore the EGR valve 1 can achieve further increase in the EGR gas flow rate in the intermediate range and in the large opening range.

Figure 9:
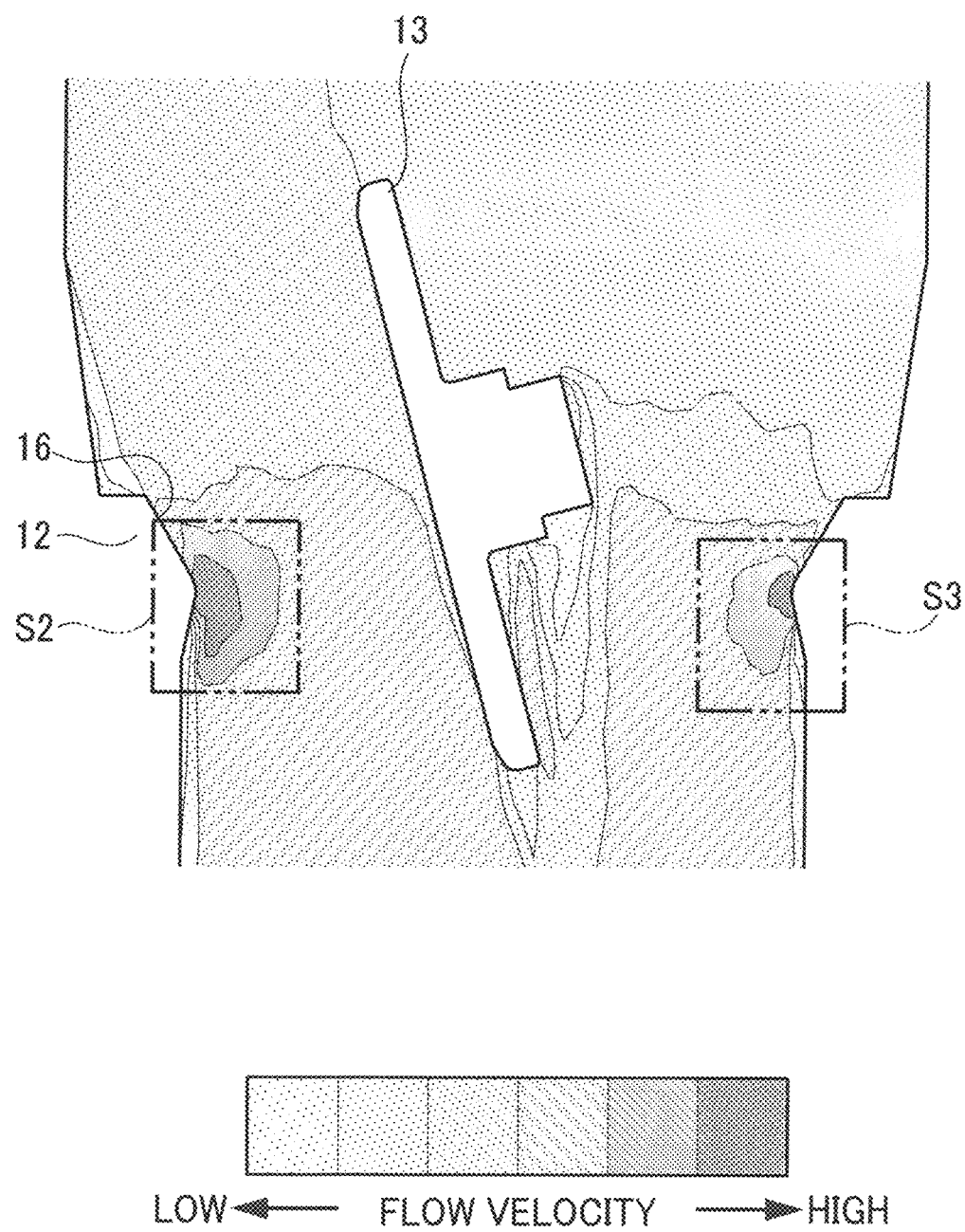

FIG. 9 is an analysis diagram of a flow velocity distribution of the EGR gas in the valve section 6 when the valve element 13 is in the valve fully-open state in the present embodiment. FIG. 10 is an analysis diagram of the flow velocity distribution of the EGR gas in the valve section when the valve element 65 is in the valve fully-open state in a comparative example (a conventional example). In the present embodiment, as indicated in chain-dot rectangles S2 and S3 in FIG. 9, the valve hole 16 of the valve seat 12 has less separation in the EGR gas flown an inner wall and has relatively smooth EGR gas flow. In the comparative example, as indicated in chain-dot rectangles S4 and S5 in FIG. 10, the valve hole 67 of the valve seat 64 has large separation in the EGR gas flow in an inner wall and has slightly rough EGR gas flow. This comparison indicates that the separation of the EGR gas flow is reduced in the valve hole 16 of the present embodiment, leading to reduction in the pressure loss of the EGR gas, and this reduction in the pressure low of the EGR gas leads to increase in the EGR gas flow rate.

FIG. 11 is a graph showing a relationship between the valve open degree of the EGR valve and the EGR gas flow rate in the present embodiment compared with the conventional example. As shown in FIG. 11, in the small opening range with the valve open degree of "0% to 40%", the flow rate can be reduced more in the present embodiment than in the conventional example. Further, in the intermediate and large opening ranges of more than "40%", the flow rate can be increased more in the present embodiment than in the conventional example.

According to the configuration of the present embodiment, the clearance G1 is formed between the outer circumferential lower part of the valve seat 12 and the valve housing 25, and thus a load subjected to the valve seat 12 is reduced when the valve seat 12 is press-fitted in the step portion 11a, so that deformation of the valve seat 12, especially deformation of the seat surface 16a can be prevented. In the present embodiment the clearance G1 is formed between the outer circumferential lower part of the valve seat 12 and the valve housing 25, and preferably, the clearance G1 is formed to extend at a height corresponding to a height of the seat surface 16a between the outer periphery of the valve seat 12 and the valve housing 25. Thus, in press-fitting the valve seat 12 in the step portion 11a, the load subjected to the outer periphery of the valve seat 12 at the height corresponding to the seat surface 16a is reduced, thus further effectively preventing deformation of the seat surface 16a. Further, in press-fitting the valve seat 12 in the step portion 11a, abrasive powder might be generated, but this abrasive powder can be contained in the clearance G1. Accordingly, the abrasive powder is prevented from entering between the step portion 11a and the valve seat 12, preventing changes in the height of the valve seat 12.

According to the configuration of the present embodiment, when the valve element 13 is about to open from the valve fully-closed state or when the valve element 13 is seated on the valve seat 12, the sealing surface 13a is out of sliding with the seat surface 16a. The valve element 13 is thus prevented from rubbing with the valve seat 12, achieving swift valve opening and closing operation of the valve element 13. This results in reduction in abrasion of the sealing surface 13a of the valve element 13 with the seat surface 16a of the valve seat 12. The EGR valve 1 can accordingly improve responsiveness and endurance its valve opening and closing.

According to the configuration of the present embodiment, the valve element 13 is placed upstream of the valve seat 12 in the passage 11 in which the EGR gas flows, and thus the pressure of the EGR gas in the valve fully-closed state of the valve element 13 is subjected to the valve element 13 to press the valve seat 12. This leads to further improvement in the sealing performance between the valve seat 12 and the valve element 13, specifically between the seat surface 16a and the sealing surface 13a.

The present invention is not limited to the above-mentioned embodiment and may be partly modified without departing from the scope of the invention.

(1) In the above embodiment, in the valve hole 16 of the valve seat 12, the inner diameter part 16c and the downstream-side flow rate regulation part 16d are provided downstream of the seat surface 16a, but the inner diameter part 16c and the downstream side flow rate regulation part 16d may be omitted.

(2) In the above embodiment, the height H1 of the upstream-side flow rate regulation part 16b is set for "40%" of the valve open degree. Alternatively, the height H1 may be set as an appropriate value within a range of "30% to 40%."

INDUSTRIAL APPLICABILITY

The present invention may be utilized for an EGR apparatus mounted in a gasoline engine or a diesel engine.

REFERENCE SIGNS LIST

1 EGR valve
11 Passage
12 Valve seat
13 Valve element
13a Sealing surface
14 Rotary shaft
14a Pin (Attachment part)
16 Valve hole
16a Seat surface
16b Upstream-side flow rate regulation part
16c Inner diameter part
16d Downstream-side flow rate regulation part
25 Valve housing
51 First side part
52 Second side part

The invention claimed is:

1. An exhaust gas recirculation valve comprising:
a housing;

a passage provided in the housing and allowing exhaust gas recirculation gas to flow therein;
a valve seat including a valve hole provided in the passage,
the valve seat including an annular seat surface formed in the valve hole;
a valve element provided in the passage and allowed to be seated on the valve seat,
the valve element of a circular disc shape including an annular sealing surface on an outer periphery in correspondence with the seat surface; and
a rotary shaft including an attachment part to which the valve element is attached, the rotary shaft being rotatable to open and close the valve element,
the exhaust gas recirculation valve being configured to rotate the rotary shaft to rotate the valve element to perform valve opening operation from a valve fully-closed state where the valve element is seated on the valve seat and the sealing surface contacts the seat surface,
wherein the valve hole of the valve seat includes an upstream-side flow rate regulation part radially expanded and tapered toward an upstream side of the EGR gas flow on an upstream side of the seat surface,
the valve element is partitioned into a first side part and a second side part with respect to a boundary defined by a virtual plane extending along an axis of the rotary shaft and configured to perform the valve opening operation from the valve fully-closed state such that the first side part rotates toward a downstream side of the exhaust gas recirculation gas from the seat surface and the second side part rotates toward the upstream-side flow rate regulation part from the seat surface, and
assuming that a valve open degree of the valve element in the valve fully-closed state is defined as 0% and the valve opening degree of the valve element in the valve fully-open state is defined as 100% after gradual increase in the valve open degree according to the valve opening operation of the valve element, a height dimension of the upstream-side flow rate regulation part in an axial direction of the valve hole is defined by the valve open degree at the time when the sealing surface of the second side part starts to move upstream of the upstream-side flow rate regulation part, and the valve open degree is set in a range of 30% to 40%.

2. The exhaust gas recirculation valve according to claim 1, wherein the valve hole of the valve seat includes an inner diameter part having the smallest diameter, the inner diameter part being positioned on a downstream side of the exhaust gas recirculation gas flow downstream of the seat surface and includes a downstream-side flow rate regulation part positioned downstream of the inner diameter part, the downstream-side flow rate regulation part being formed radially expanded and tapered toward the downstream side.

3. An exhaust gas recirculation valve comprising:
a housing;
a passage provided in the housing and allowing exhaust gas recirculation gas to flow therein;
a valve seat including a valve hole provided in the passage,
the valve seat including an annular seat surface formed in the valve hole;
a valve element provided in the passage and allowed to be seated on the valve seat,
the valve element of a circular disc shape including an annular sealing surface on an outer periphery in correspondence with the seat surface; and
a rotary shaft including an attachment part to which the valve element is attached, the rotary shaft being rotatable to open and close the valve element,
the exhaust gas recirculation valve being configured to rotate the rotary shaft to rotate the valve element to perform valve opening operation from a valve fully-closed state where the valve element is seated on the valve seat and the sealing surface contacts the seat surface,
wherein the valve hole of the valve seat includes an upstream-side flow rate regulation part radially expanded and tapered toward an upstream side of the EGR gas flow on an upstream side of the seat surface,
the valve hole of the valve seat includes an inner diameter part having the smallest diameter, the inner diameter part being positioned on a downstream side of the exhaust gas recirculation gas flow downstream of the seat surface and includes a downstream-side flow rate regulation part positioned downstream of the inner diameter part, the downstream-side flow rate regulation part being formed radially expanded and tapered toward the downstream side, and
a first angle formed by the seat surface and the upstream-side flow rate regulation part, a second angle formed by the seat surface and the inner diameter part, and a third angle formed by the inner diameter part and the downstream-side flow rate regulation part are each set for 20° or less in an axial direction of the valve hole.

* * * * *